United States Patent [19]
Denzin

[11] Patent Number: 4,649,489
[45] Date of Patent: Mar. 10, 1987

[54] METHOD FOR DATE-SETTING ELECTRONICALLY-CONTROLLED POSTAGE MACHINES

[75] Inventor: Horst Denzin, Berlin, Fed. Rep. of Germany

[73] Assignee: Francotyp GmbH, Berlin, Fed. Rep. of Germany

[21] Appl. No.: 554,218

[22] Filed: Nov. 22, 1983

[30] Foreign Application Priority Data

Nov. 23, 1982 [DE] Fed. Rep. of Germany ....... 3243696

[51] Int. Cl.[4] ........................ G07B 17/02; G06F 3/02; G06F 3/12; B41K 3/08

[52] U.S. Cl. .................................... 364/464; 364/145; 364/523

[58] Field of Search ............... 364/464, 466, 145, 519, 364/523; 340/68

[56] References Cited

U.S. PATENT DOCUMENTS

| | | | |
|---|---|---|---|
| 4,283,721 | 8/1981 | Eckert et al. | 340/680 |
| 4,301,507 | 11/1981 | Soderberg et al. | 364/464 |
| 4,335,434 | 6/1982 | Baumann et al. | 364/464 |
| 4,363,693 | 12/1982 | Fujii et al. | 364/466 X |
| 4,398,458 | 8/1983 | Denzin et al. | 101/91 |
| 4,541,053 | 9/1985 | Knoth et al. | 364/466 |

FOREIGN PATENT DOCUMENTS

| | | | |
|---|---|---|---|
| 55-46106 | 3/1980 | Japan | 364/466 |
| 56-154622 | 11/1981 | Japan | 364/466 |

*Primary Examiner*—Felix D. Gruber
*Attorney, Agent, or Firm*—Herbert L. Lerner; Laurence A. Greenberg

[57] ABSTRACT

A method for setting type wheels of a date printer in electronically-controlled postage machines, includes print rollers, gear racks connected to the print rollers and the type wheels, stepping motors connected to the gear racks for activating the gear racks for setting selected print rollers and for setting the type wheels for printing postage values, an electronic logic circuit connected to the stepping motors for storing a date, a decimal keyboard connected to the electronic logic circuit for setting postage values and entering a date into the electronic logic circuit, and a function key connected to the electronic logic circuit, which comprises setting a date by using the decimal keyboard in conjunction with the function key, performing a comparison with the electronic logic circuit of a date entered into the electronic logic circuit by the decimal keyboard and a date stored in the electronic logic circuit, and resetting the type wheels in case of a deviation between the entered and stored dates, or using a number and/or code input from the decimal keyboard for initiating the comparison and the resetting of the type wheels, respectively, instead of a function key.

11 Claims, 3 Drawing Figures

METHOD FOR DATE-SETTING ELECTRONICALLY-CONTROLLED POSTAGE MACHINES

BACKGROUND OF THE INVENTION

1. Field of the Invention

This invention relates to a method for setting type wheels of a date printer in electronically-controlled postage machines, including stepping motors and gear racks activated by the stepping motors for setting the type wheels for printing postage values and for setting selected printing rollers.

In conventional postage machines, the dates are set manually by means of a simple tool. For example, the individual type wheels may be set by a pin or by special knurled knob devices. Levers which are controlled by keys may also be provided. The use of an additional tool requires provisions to be made in the event that this tool is lost, and a knurled knob or a lever device require additional mechanical safety provisions against unintentional setting changes. Since the type wheels are disposed within the postage machine, additional safety provisions are required in order to prevent the operation of the machine during the time that the date setting is made.

Furthermore, the numbers on the type wheels are relatively small and are rather difficult to recognize as printing types, so that faulty settings do occur more frequently.

2. Description of the Prior Art

Consequently, the mechanical setting of the date is unreliable and is not satisfactory mechanically or economically. The known prior art includes a device in which additional type wheels are operated by means of stepping motors and specially constructed gear racks. The control of the stepping motors is effected in such a device by a keyboard and by electronic logic circuitry, such as a microprocessor in connection with registers, storage memories and sensors which monitor the setting of the gear racks.

It is accordingly an object of the invention to provide a method for date-setting electronically-controlled postage machines, which overcomes the hereinafore-mentioned disadvantages of the heretofore-known methods of this general type, and wherein the above-mentioned additional mechanical safety measures are not required and their shortcomings are thereby eliminated as well.

SUMMARY OF THE INVENTION

With the foregoing and other objects in view there is provided, in accordance with the invention, a method for setting type wheels of a date printer in electronically-controlled postage machines, including print rollers, gear racks connected to the print rollers and the type wheels, stepping motors connected to the gear racks for activating the gear racks for setting selected print rollers and for setting the type wheels for printing postage values, an electronic logic circuit connected to the stepping motors for storing a date, a decimal keyboard connected to the electronic logic circuit for setting postage values and entering a date into the electronic logic circuit, and a function key connected to the electronic logic circuit, which comprises setting a date using the decimal keyboard in conjunction with the function key, performing a comparison with the electronic logic circuit of a date entered into the electronic logic circuit by the decimal keyboard and a date stored in the electronic logic circuit, and resetting the type wheels in case of a deviation between the entered and stored date.

In accordance with another mode of the invention there is provided a method which comprises using a number and/or code input from the decimal keyboard for initiating the comparison and the resetting of the type wheels, respectively, instead of a function key.

In accordance with a further mode of the invention, there is provided a method which includes number rolls of the date printer, which comprises resetting the number rolls only after operating the function key, if the date to be entered is chronologically after the stored date.

In accordance with an added mode of the invention, there is provided a method which includes a calendar module, which comprises performing an automatic date setting by coupling the electronic logic circuit with the calendar module.

In accordance with an additional mode of the invention, there is provided a method which includes a memory connected to the calendar module, which outputs pulses. These pulses are stored and are read out for advancing the date printer through a plurality of steps.

In accordance with again another mode of the invention, there is provided a method which comprises using the calendar module after the postage machine is turned on for blocking the decimal keyboard for setting postage values until the date setting operation is completed.

In accordance with again a further mode of the invention, there is provided a method which comprises providing an empty space on the type wheels of the date printer permitting a setting of the printer in which a date is not printed.

In accordance with a concomitant mode of the invention, there is provided a method which includes an indicating device connected to the electronic logic circuit, which comprises visually displaying the stored date on the indicating device for a given period of time after the postage machine has been turned on.

Other features which are considered as characteristic for the invention are set forth in the appended claims.

Although the invention is illustrated and described herein as embodied in a method for date-setting electronically-controlled postage machines, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying single figure of the drawing which is a block circuit diagram of a device for carrying out the method of the invention.

DESCRIPTION OF THE PREFERRED EMBODIMENT

Figure 1:
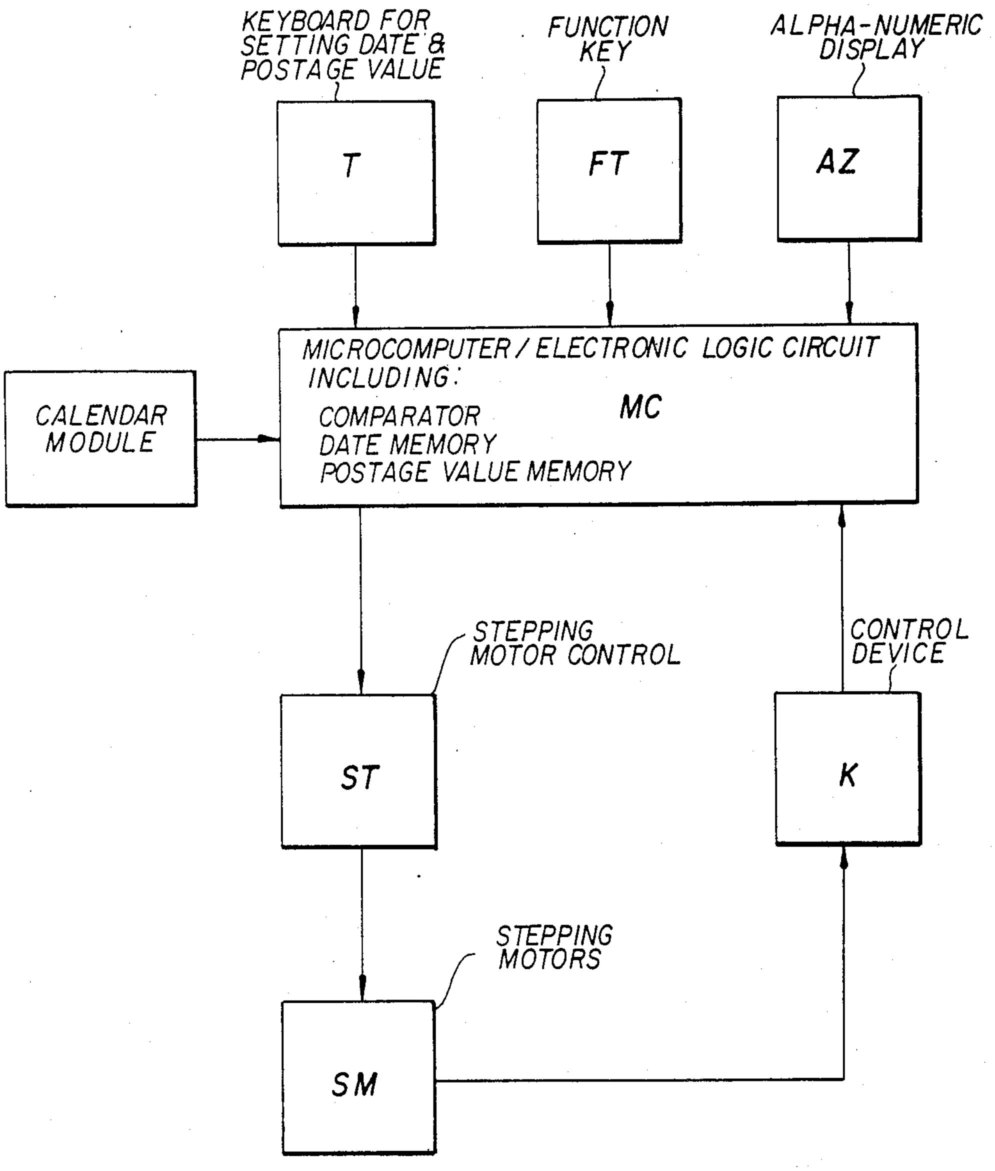
FIG. 1 is a block diagram of the main parts of the invention.

Referring now to FIG. 1 of the drawing in detail, there is seen an existing postage value keyboard T for setting the postage values of a postage machine, which is also used for setting the date.

The date appears on an alpha-numerical display AZ, which preferably is an illuminated number display of the machine. A function key FT may be operated in order to cause an electronic logic circuit or microcomputer MC to compare the date input with a pre-set value or date, and if required, to initiate again a setting of the type wheels of a date printer with stepping motors SM through a stepping motor control ST. A control device K is provided to transmit the positions of the stepping motors SM to the electronic logic circuit MC for comparison with the previously set values.

The function key FT or the keyboard for setting the date, as well as other function keys for setting the postage value, and/or selected special print (such as registered mail, printed matter, etc.), which must be operated after the input of a value, can also be replaced by means of decimal keys for setting the postage values. Alternatively, coded inputs may be used where the microprocessor is suitably programmed to accept codes.

For the date input, for example, the logic circuitry of the machine is constructed in such a way that only dates can be set, which are chronological after the date already stored in the machine, so that it is impossible to set the date back.

The stored date is always displayed for a short time, perhaps five seconds, as the postage machine is turned on. If a new date is required, the corrected new date is visually displayed on the indicating display AZ.

Instead of performing a manual date input by means of the postage value keyboard T, the automatic setting of the date represents a further development of the invention, using the already existing electronic control elements in conjunction with a somewhat more sophisticated structure, wherein a calender module is coupled with the electronic logic circuit MC, such as a commercially conventional clock circuit with date information. Each change in the date is reported from the calendar module to the logic circuit by a pulse which is stored by the logic circuit in the form of a count and when the machine is turned on, the logic circuit causes the correct setting of the date printer. This also includes the counting of several pulses and the corresponding advancement of the date printer by several steps, as is required, for example, after weekends, holidays, vacations, etc. When the postage machine is turned on the first time, the indicating display AZ then shows a blocking signal. It is only after the automatic setting of the correct or valid date that the display thereof appears, and that the keyboard T of the postage machine is unblocked for setting the postage values.

The type wheels of the date printer are constructed in such a way that there is at least one empty place. This empty place, i.e. a position which has no number, or which has a symbol, such as a star or a dash etc. instead of a number, is provided in order to perform a setting without a date, as required by some Post Offices, for example. This setting is performed by operating a postage value key T ZERO, and an additional function key FT for permitting the date-free setting. Instead of the additional function key FT, the input of a code number by means of the postage value keyboard T can also be used, as is provided in another embodiment.

After the postage machine has been turned off, and is then turned on again, two variations of the date setting are provided: either no date is set, or the last date is set again. The variation chosen depends on the customer, and can be achieved by simple program storage. As described above, the respective actual date is always set in this way, if a calendar module is used.

The invention includes a method for setting type wheels of a date printer in electronically-controlled postage machines. The postage machine according to the invention includes print rollers, gear racks connected to the print rollers and to the type wheels. Stepping motors are connected to the gear racks for activating the gear racks for setting selected print rollers and for setting the type wheels for printing the postage values. An electronic logic circuit is connected to the stepping motors for storing a date and a decimal keyboard is connected to the electronic logic circuit for setting postage values and for entering a date into the electronic logic circuit. The method further comprises setting a date with the decimal keyboard, transmitting an input signal from the decimal keyboard to the electronic logic circuit for initiating a comparison with the electronic logic circuit of a date entered into the electronic logic by the decimal keyboard and a date stored in the electronic logic circuit.

The method further includes resetting the type wheels in case there is a deviation between the entered and stored dates.

Figure 2A:
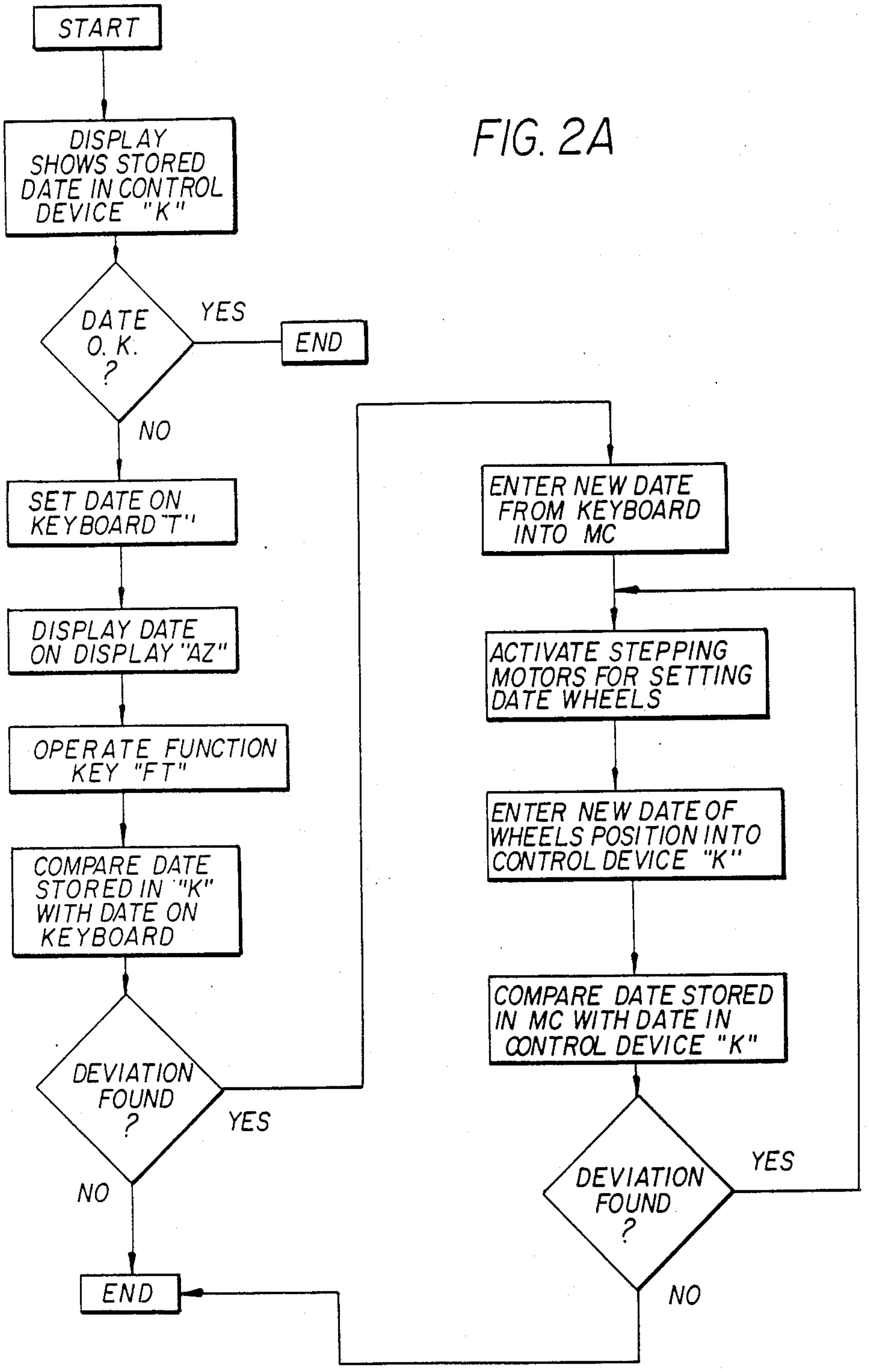
FIG. 2A is a flow chart showing the steps of the operation of the invention, showing the steps of setting a date in the keyboard, displaying the date and advancing the date.

FIG. 2A is a flow-chart showing the steps of setting a date in the keyboard, displaying the date and advancing the date.

Figure 2B:
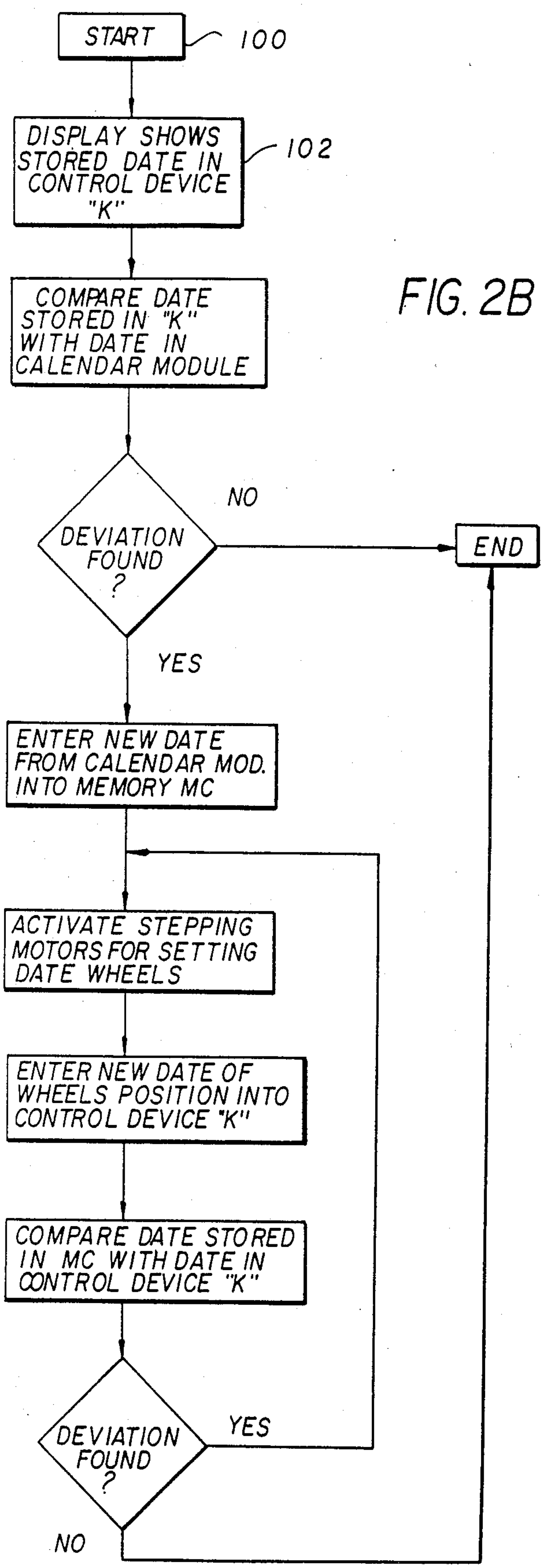
FIG. 2B is a flow chart showing the steps of FIG. 2A and further including the steps of entering a new date from a calendar module.

FIG. 2B is a flow-chart showing the steps of FIG. 2A and includes further the steps of entering a new date from a clock calendar-module, seen in FIG. 1.

What is claimed is:

1. Method for setting type wheels of a date printer in electronically-controlled postage machines, including print rollers, gear racks connected to the print rollers and the type wheels, stepping motors connected to the gear racks for activating the gear racks for setting selected print rollers and for setting the type wheels for printing postage values, an electronic logic circuit connected to the stepping motors for storing a date, a keyboard connected to the electronic logic circuit for setting postage values and for entering a date into the electronic logic circuit, and a function key connected to the electronic logic circuit, the method which comprises setting a date by using the keyboard in conjunction with the function key, performing a comparison by the electronic logic circuit between a date already stored in the electronic logic circuit and the date on the keyboard and advancing the type wheels in case of a deviation between the entered and stored dates, repeating the comparison and advancing the date wheels until the comparison shows no deviation.

2. Method for setting type wheels of a date printer in electronically-controlled postage machines, according to claim 1; the electronic logic circuit connected to the stepping motors for storing a postage value, and the keyboard connected to the electronic logic circuit for setting postage values and entering a postage value into the electronic logic circuit, the method which comprises setting a postage value with the decimal keyboard, initiating a comparison by the electronic logic circuit of a postage value already entered into the electronic logic circuit by the keyboard, advancing the type wheels in case of a deviation between the entered and stored postage values, repeating the comparison and advancing the type wheels until the comparison shows no deviation.

3. Method according to claim 2, which comprises transmitting an input signal from the keyboard to the electronic logic circuit; forming the input signal as a number input.

4. Method according to claim 2, which comprises transmitting an input signal from the keyboard to the electronic logic circuit; forming the input signal as a code input.

5. Method according to claim 1, wherein the date printer includes number rolls, the method which comprises again setting the number rolls only after operating the function key, if the date to be entered is chronologically following the stored date.

6. Method according to claim 1, including a calendar module, which comprises performing an automatic date setting by coupling the electronic logic circuit with the calendar module.

7. Method according to claim 6, including a pulse memory connected to the calendar module, which comprises using the calendar module for storing a pulse in the form of a count in the memory for advancing the data printer through a plurality of steps.

8. Method according to claim 7, which comprises using the calendar module after the postage machine is turned on for blocking the decimal keyboard for setting postage values until the date setting operation is completed.

9. Method according to claim 1, which comprises providing an empty space on the type wheels of the date printer permitting a setting of the printer in which a date is not printed.

10. Method according to claim 2, which comprises providing an empty space on the type wheels of the date printer permitting a setting of the printer in which a date is not printed.

11. Method according to claim 1, including an indicating device connected to the electronic logic circuit, which comprises visually displaying the stored date on the indicating device for a given period of time after the postage machine has been turned on.

* * * * *